(12) United States Patent
Dai et al.

(10) Patent No.: US 7,518,260 B2
(45) Date of Patent: Apr. 14, 2009

(54) METHOD AND APPARATUS TO MONITOR VEHICULAR TRAFFIC

(75) Inventors: Xiaowen Dai, Shelby Township, MI (US); Robert P. Roesser, Southfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 407 days.

(21) Appl. No.: 11/242,742

(22) Filed: Oct. 4, 2005

(65) Prior Publication Data

US 2007/0076918 A1    Apr. 5, 2007

(51) Int. Cl.
    *B60L 1/00*    (2006.01)
(52) U.S. Cl. ........................................ 307/9.1
(58) Field of Classification Search .................... 307/9.1
    See application file for complete search history.

(56) References Cited

U.S. PATENT DOCUMENTS 6,747,687 B1 *  6/2004  Alves ........................ 348/148
6,798,357 B1    9/2004  Khan
6,813,247 B1   11/2004  Hassan
6,879,907 B2    4/2005  Feldman et al.
6,917,306 B2    7/2005  Lilja
6,917,876 B2    7/2005  Martell et al.
7,155,335 B2 * 12/2006  Rennels ...................... 701/117
2002/0186297 A1 * 12/2002  Bakewell ..................... 348/118
2006/0139454 A1 *  6/2006  Trapani ....................... 348/148

* cited by examiner

*Primary Examiner*—Robert L. Deberadinis

(57) ABSTRACT

A vehicle traffic monitoring apparatus includes an imaging device; an image processing device; a global positioning device; and, a wireless communications system. The image processing device includes a computer program to process a data stream from the imaging device, to recognize individual vehicles substantially in view of the vehicle; and, quantify motion of the recognized individual vehicles. A second data stream is a signal output from the image processing device and includes code representing the recognized individual vehicles in view of the vehicle, quantified motion of the recognized vehicles; and vehicle position data from the global positioning system receiver. The wireless communications device receives the second data stream and communicates it a remote device. Localized traffic is monitored in metrics of traffic density, congestion, and, turbulence.

20 Claims, 1 Drawing Sheet

METHOD AND APPARATUS TO MONITOR VEHICULAR TRAFFIC

TECHNICAL FIELD

This invention pertains generally to motor vehicles, and more specifically to motor vehicles having on-board capability to measure, analyze, and communicate traffic patterns.

BACKGROUND OF THE INVENTION

There is an ongoing need to improve flow of traffic, to reduce congestion, reduce consumption of fuel, and reduce incidence of traffic accidents and related tie-ups. Numerous efforts are being made to provide vehicle operators with route guidance. Some exemplary systems include a route guidance system for vehicles including central computing and transmitting apparatus by way of which the central computing apparatus is informed of the positions of respective vehicles on a road network and the vehicles are supplied with route guidance data calculated by the central computing apparatus regarding the best routes for the respective vehicles to take to respective desired destinations. The transmitting apparatus carried by the respective vehicles informs the central computing apparatus of the desired destinations. The computing apparatus informs the central computing apparatus as to traffic congestion on the network, and includes speech synthesizers used by the vehicles and to speak instructions to the vehicle operators as to the routes to be taken to desired destinations. Another system comprises a radio linked vehicle communication system for text messaging, traffic light control, resource management and traffic monitoring. It is designed to establish the location of emergency vehicles and related privately owned vehicles within their vicinity and have this information relayed to a third party using conventional electronic devices. The purpose of this system is to notify the privately owned vehicle or vehicles in close proximity of an emergency vehicle of their presence, so as to avoid possible accidents and to relay this information to a third party to be recorded and verified.

Another system provides for modeling and processing vehicular traffic data and information. This includes transforming a spatial representation of a road network into a network of spatially interdependent and interrelated oriented road sections, for forming an oriented road section network. A variety of vehicular traffic data and information associated with the oriented road section network is acquired from a variety of sources.

Another system describes collecting traffic information using one or more aircraft, such as helicopters, flying predetermined flight paths above a geographic area. The flight paths are determined so that portions of roads for which traffic information is to be collected are within the ranges of remote velocity sensors located on board the aircraft during the flights of these aircraft along their respective flight paths. Each aircraft includes positioning equipment that allows the precise position (i.e., altitude, latitude, and longitude) and attitude (i.e., roll, pitch, and yaw) of the aircraft during its flight to be determined. During a flight along the predetermined flight path, the remote velocity sensor in each aircraft is operated to perform scans of locations on roadways in the geographic area. Using a precise road map database and taking into account the location, velocity and attitude of the aircraft while each scan is being made, data indicating traffic conditions along the roadways are collected.

There remains a need to provide an on-vehicle system capable of monitoring and analyzing localized traffic information which provides this information to a central computing apparatus to provide route guidance data to vehicle operators in the localized area, to assist in planning traffic routing and management.

SUMMARY OF THE INVENTION

Therefore, it is proposed to place video processing units into volunteer vehicles to assess traffic conditions in real-time. This assessment and analysis is sent to a central traffic management center. Each volunteer vehicle is preferably equipped with one or more video cameras, and has a video image processing unit and an interface to an on-board wireless communications device. At least one video device is forward-facing in the vehicle, and has a wide-angle lens to capture a multi-lane image. Cameras looking orthogonal to the direction of traffic flow are to augment the view of the forward-facing camera. A global positioning system ('GPS') receiver is included to estimate vehicle speed, position, and directional heading. Image-processing algorithms are used to recognize individual vehicles and their relative movement. Local traffic is analyzed and categorized along three or more dimensions, including vehicle density, congestion, and speed variation and lane changing, or turbulence. Traffic incidents, e.g. stopped or disabled vehicles, presence of emergency vehicles, or presence of work-crews, are detected and reported.

Processed video and GPS data are selectively sent to a traffic management center over a wireless communication channel. This data is typically sent at regular intervals, and, preferably when a significant change in traffic conditions has been detected. The data is compiled and analyzed, and made available to vehicle operators and other users, e.g. traffic reporting services, for use in various publications and rebroadcasts.

Therefore, in accordance with the present invention, a host vehicle for monitoring localized vehicular traffic is presented, comprising an imaging device; an image processing device; a global positioning system receiver; and, a wireless communications system.

Another aspect of the invention comprises the image processing device including a remote storage medium having a computer program encoded therein for effecting a method to process a first data stream consisting of a signal from the imaging device, wherein the computer program includes code to recognize individual vehicles substantially adjacent to the host vehicle; and, code to quantify motion of the recognized individual vehicles.

Another aspect of the invention comprises a second data stream, which is a signal output from the image processing device and includes code representing recognized individual vehicles substantially adjacent to the host vehicle; code representing quantified motion of the recognized individual vehicles; and, code representing host vehicle position data output from the global positioning system receiver.

Another aspect of the invention comprises the wireless communications device operable to receive the second data stream from the image processing device; and communicate the second data stream to a remote device.

A further aspect of the invention comprises the computer program including code to categorize localized traffic in metrics of traffic density, congestion and turbulence.

Another aspect of the invention comprises the imaging device operable to capture images representing vehicles substantially in front of the host vehicle and traveling in the same direction.

A further aspect of the invention comprises the imaging device operable to capture images representing vehicles substantially along a side of the host vehicle and traveling in the same direction.

A further aspect of the invention comprises the imaging device operable to capture images representing stationary objects on and near a highway surface.

Another aspect of the invention comprises the wireless communications system being a dedicated short-range communications system operable to communicate with a remote receiver.

Another aspect of the invention comprises the imaging device, the image processing device, the global positioning system receiver, and, the wireless communications system substantially integrated into a vehicle control system.

Another aspect of the invention comprises the digital imaging device, the digital image processing device, the global positioning system receiver, and, the dedicated short-range communications device operable to communicate via a local area network on-board the vehicle.

Another aspect of the invention comprises the imaging device, the image processing device, the global positioning system receiver, and, the wireless communications system being a dedicated, stand-alone device readily removable from the vehicle.

A further aspect of the invention comprises a method to monitor localized vehicular traffic, including equipping a vehicle operable to travel on highway surfaces with an imaging device, an image processing device, a global positioning system receiver, and, a wireless communications system; processing a first data stream, comprising a signal from the imaging device; creating a second data stream; and, communicating the second data stream to a remote device.

These and other aspects of the invention will become apparent to those skilled in the art upon reading and understanding the following detailed description of the embodiments.

BRIEF DESCRIPTION OF THE DRAWING

The invention may take physical form in certain parts and arrangement of parts, the preferred embodiment of which will be described in detail and illustrated in the accompanying drawing which forms a part hereof, and wherein:

The FIGURE is a schematic system, in accordance with the present invention.

DETAILED DESCRIPTION OF THE PREFERRED EMBODIMENT

Figure 1:
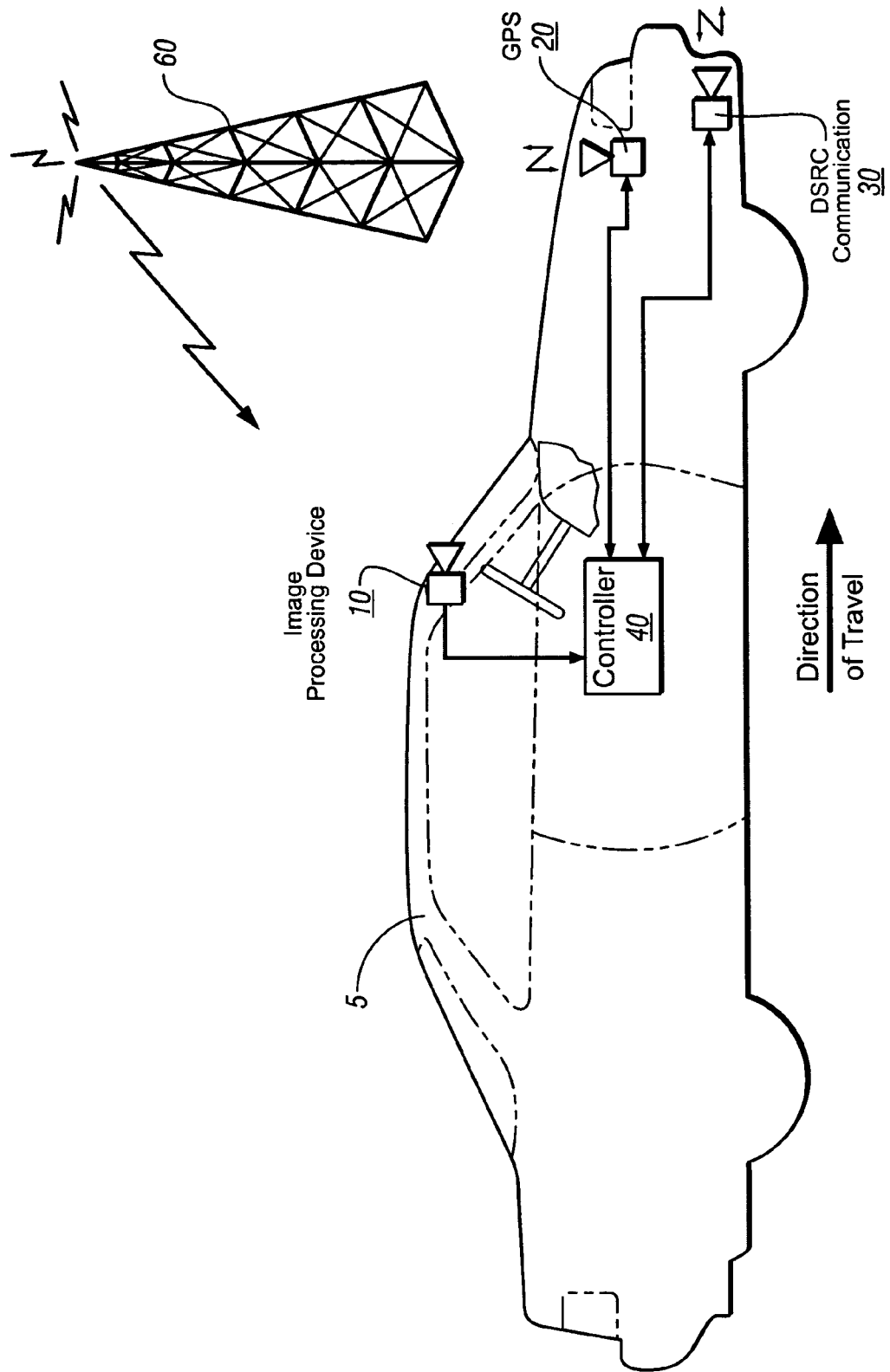

Referring now to the drawing, wherein the showings are for the purpose of illustrating the invention only and not for the purpose of limiting the same, the figure shows a host vehicle 5 and visual imaging system which has been constructed in accordance with an embodiment of the present invention.

An exemplary host vehicle 5, shown as an automobile, is operable to travel on a variety of public roadways hereafter referred to as highway surfaces, is preferably equipped for monitoring localized vehicular traffic. The host vehicle includes at least one imaging device 10, an image processing device 40, a global positioning system ('GPS') receiver 20, and a wireless communications system 30. The wireless communications system 30 is preferably operable to communicate with a remote receiver 60 having additional capability for traffic management and other tasks. The imaging device, image processing device, GPS receiver, and, wireless communications system comprise a system substantially integrated into an overall vehicle control system, comprising one or more controllers operable to communicate and control various vehicle operating systems via one or more local area networks on-board the vehicle. Alternatively, the imaging device, image processing device, GPS receiver, and, wireless communications system comprise a dedicated, stand-alone device readily removable from the vehicle for ready installation into another vehicle.

The imaging device 10 preferably comprises a digital camera, mounted to capture images and equipped with a wide-angle optics. The imaging device is operable to regularly and ongoingly capture video images representing a panoramic view of the highway generally in front of the vehicle, and preferably including multiple lanes of traffic, road shoulders, and roadside berms and pull-off lanes. The digital camera is able to generate a first data stream consisting of a signal representing the captured images, comprising vehicles and other items in view of the imaging device 10 on the host vehicle 5. Alternatively, there are additional digital cameras operable to capture video images representing a view of the road surface and traffic that is along one or both sides of the vehicle.

Alternatively, the imaging device 10 comprises a short-range radar device, mounted to capture radar-type images. In this alternate embodiment, the radar device is operable to regularly and ongoingly capture radar images representing a panoramic view of the highway generally in front of the vehicle, and preferably including multiple lanes of traffic, road shoulders, and roadside berms and pull-off lanes. The radar device is operable to generate the first data stream consisting of the signal representing the captured images, comprising vehicles and other items in view of the imaging device 10 on the host vehicle 5, as previously described.

Alternatively, the imaging device 10 comprises the digital camera augmented by the short-range radar device and operable to generate the first data stream consisting of the signal representing the captured images.

The image processing device 40 preferably comprises an electronic controller comprising a digital microprocessor with a high speed clock, RAM, ROM, hard-drive memory and I/O devices. Inputs to the image processing device include the first data stream from the imaging device 10, and, vehicle position data input from the GPS device 20. A plurality of digital computer programs is encoded therein, operable to effect communications with the imaging device(s) and with the wireless communications system 30, and to process the first data stream from the imaging device(s). The computer program for processing the first data stream preferably includes a pattern recognition software scheme operable to recognize presence of individual vehicles that are in view of the imaging device 10, and preferably, vehicles traveling in the same direction on the same roadway. The individual vehicles preferably including vehicles traveling on the road surface, and, stationary vehicles on and near the road surface. Furthermore, there is a software scheme operable to quantify motion of the recognized individual vehicles.

The image processing device 40 is operable to generate a second data stream. The second data stream comprises computer code representing the recognized individual vehicles in view of the imaging device, quantified motion of the recognized individual vehicles; and, code representing vehicle position data output from the GPS device 20. The second data stream is communicated to the wireless communications device 30. The wireless communications device may comprise any one of several existing wireless communication devices operable to communicate digital data streams via a signal generator, to an antenna and remote receiver 60. The wireless communication device preferably comprises a cellular data transceiver which operates to receive the second data stream from the image processing device; and, communicate the second data stream to the remote receiver 60.

The image processing device 40 may have further capability to analyze the first data stream in addition to identifying recognized individual vehicles in view of the imaging device and quantifying motion of the recognized individual vehicles. By monitoring and analyzing positions and speeds of the recognized vehicles over an elapsed period of time, the image processing device 40 is operable to analyze traffic patterns in metrics of traffic density, i.e. volume of vehicles; traffic congestion, i.e. average vehicle speed and effect upon travel time; and, traffic turbulence, i.e. variability of vehicle speeds and quantity of lane changes.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Vehicle traffic monitoring apparatus, comprising:
    an imaging device mounted to a host vehicle;
    an image processing device, including a computer program encoded therein for effecting a method to process a first data stream comprising a signal from the imaging device, the computer program comprising:
        code to recognize presence of individual vehicles substantially in view of the imaging device;
    a global positioning system receiver; and,
    a wireless communications system.

2. The apparatus of claim 1, wherein the image processing device comprises:
    a remote storage medium having the computer program encoded therein; and
    the computer program further comprising:
        code to quantify motion of the recognized individual vehicles.

3. The apparatus of claim 2, wherein a second data stream is output from the image processing device, the second data stream comprising:
    code representing the recognized individual vehicles substantially in view of the imaging device;
    code representing quantified motions of the recognized individual vehicles; and,
    code representing vehicle position data output from the global positioning system receiver.

4. The apparatus of claim 3, wherein the wireless communications device is operable to:
    a. receive the second data stream from the image processing device; and,
    b. communicate the second data stream to a remote device.

5. The apparatus of claim 2, wherein the computer program further comprises:
    code to categorize localized traffic in metrics of traffic density, congestion and turbulence.

6. The apparatus of claim 1, wherein the imaging device is operable to capture images representing mobile vehicles substantially in front of the host vehicle and traveling in the same direction.

7. The apparatus of claim 6, wherein the imaging device is further operable to capture images representing mobile vehicles substantially along a side of the host vehicle and traveling in the same direction.

8. The apparatus of claim 6, wherein the imaging device is further operable to capture images representing stationary vehicles on and near highway surfaces.

9. The apparatus of claim 1, wherein the wireless communications system comprises a dedicated short-range communications system operable to communicate with a remote receiver.

10. The apparatus of claim 1, wherein the wireless communications system comprises a cellular data transceiver operable to communicate with a remote receiver.

11. The apparatus of claim 1, wherein the imaging device, the image processing device, the global positioning system receiver and the wireless communications system comprise a system substantially integrated into a vehicle control system.

12. The apparatus of claim 11, further comprising: the digital imaging device, the digital image processing device, the global positioning system receiver and the dedicated short-range communications device operable to communicate via a local area network on-board the host vehicle.

13. The apparatus of claim 1, wherein the imaging device, the image processing device, the global positioning system receiver, and the wireless communications system comprise a dedicated, stand-alone device readily removable from the vehicle.

14. Method to monitor localized vehicular traffic, comprising:
    equipping a host vehicle operable to travel on highway surfaces with an imaging device, an image processing device, a global positioning system receiver, and a wireless communications system;
    processing a first data stream, comprising a signal from the imaging device;
    creating a second data stream; and,
    communicating the second data stream to a remote device; and wherein processing a first data stream comprises:
    recognizing individual vehicles substantially in view of the imaging device.

15. The method of claim 14, wherein processing a first data stream further comprises:
    quantifying motion of the recognized individual vehicles.

16. The method of claim 15, further comprising:
    categorizing localized traffic in metrics of traffic density, congestion, and, turbulence.

17. The method of claim 14, wherein creating a second data stream comprises
    creating a data stream comprising information interpretable as:
    recognized individual vehicles substantially in view of the imaging device;
    quantified motion of the recognized individual vehicles; and,
    vehicle position data output from the global positioning system receiver.

18. The method of claim 14, wherein the signal from the imaging device comprises images representing mobile vehicles substantially in front of the host vehicle and traveling in the same direction.

19. The method of claim 18, wherein the signal from the imaging device further comprises images representing mobile vehicles substantially along a side of the host vehicle and traveling in the same direction.

20. The method of claim 18, wherein the signal from the imaging device comprises images representing stationary vehicles on and near highway surfaces.

* * * * *